(12) United States Patent
Sakai et al.

(10) Patent No.: US 6,284,216 B1
(45) Date of Patent: Sep. 4, 2001

(54) BARIUM TITANATE POWDER

(75) Inventors: Hideki Sakai; Matsuhide Horikawa; Wataru Kagohashi, all of Chigasaki (JP)

(73) Assignee: Toho Titanium Co., Ltd., Chigasaki (JP)

(*) Notice: Subject to any disclaimer, the term of this patent is extended or adjusted under 35 U.S.C. 154(b) by 0 days.

(21) Appl. No.: 09/462,659

(22) Filed: Jan. 12, 2000

(30) Foreign Application Priority Data

May 20, 1998 (JP) .................................................. 10-139020

(51) Int. Cl.[7] .................. C01G 23/00; C01G 23/047; C01F 11/02; C01F 5/02; C01F 5/14

(52) U.S. Cl. ...................... 423/598; 423/610; 423/611; 423/612; 423/635; 502/340; 502/350; 501/137

(58) Field of Search ...................... 423/598, 608, 423/610, 611, 612, 635, 636; 501/137; 502/340, 350

(56) References Cited

U.S. PATENT DOCUMENTS

| | | | |
|---|---|---|---|
| 3,647,364 | * | 3/1972 | Mazdiyasni et al. ............... 23/51 R |
| 4,520,004 | * | 5/1985 | Uedaira e tal. ..................... 423/598 |
| 4,755,373 | * | 7/1988 | Gheradi et al. ..................... 423/598 |
| 4,764,493 | * | 8/1988 | Lilley et al. ........................ 501/137 |
| 4,829,033 | * | 5/1989 | Menashi et al. .................... 501/139 |
| 4,832,939 | * | 5/1989 | Menashi et al. .................... 423/598 |
| 4,859,448 | * | 8/1989 | Klee et al. .......................... 423/598 |
| 4,898,843 | * | 2/1990 | Matsuhita et al. .................. 501/136 |
| 5,009,876 | * | 4/1991 | Hennings et al. .................. 423/598 |
| 5,013,538 | * | 5/1991 | Seon ................................... 423/608 |
| 5,032,375 | * | 7/1991 | Lerot et al. ......................... 423/598 |
| 5,242,674 | * | 9/1993 | Bruno et al. ........................ 423/593 |
| 5,523,065 | * | 6/1996 | Stangle et al. ...................... 423/71 |
| 5,783,165 | * | 7/1998 | Wilson et al. ...................... 423/598 |
| 5,846,505 | * | 12/1998 | Saegusa ............................. 423/263 |
| 5,900,223 | * | 5/1999 | Matijevic et al. .................. 423/263 |
| 5,977,004 | * | 11/1999 | Higashi et al. ..................... 501/135 |
| 6,129,903 | * | 10/2000 | Kerchner ............................ 423/598 |
| 6,162,752 | * | 12/2000 | Kawamoto et al. ................ 501/137 |

FOREIGN PATENT DOCUMENTS

| | | |
|---|---|---|
| 60-155532 | 8/1985 | (JP) . |
| 1-286923 | 11/1989 | (JP) . |
| 4-12020 | 1/1992 | (JP) . |
| 5-16943 | 1/1993 | (JP) . |
| 5-178617 | 7/1993 | (JP) . |
| 5-330824 | 12/1993 | (JP) . |
| 7-232923 | 9/1995 | (JP) . |

OTHER PUBLICATIONS

Kyung–Hee Lee et al., A Study of $BaTiO_3$ Synthesis byDirect Wet Process, Journal of the Korean Ceramic Society, vol. 21, No. 4, pp. 323–326, 1984.

Woo–Seok Cho et al., Synthesis Of Ultrafine $BaTiO_3$ Particles From Polymeric Precursor: Their Structure and Surface Property, Journal of Alloys and Compounds, 266, pp. 118–122, 1998.

* cited by examiner

Primary Examiner—Steven P. Griffin
Assistant Examiner—Cam N. Nguyen
(74) Attorney, Agent, or Firm—Oliff & Berridge, PLC

(57) ABSTRACT

A barium titanate powder has an average particle size ranging from 0.1–1.0 $\mu$m, a CV value (standard deviation of the particle size/the average particle size) of the particle size distribution being 40% or less, and a zeta-potential ranging from −30 to −60 mV measured by a laser Doppler method using electrophoresis at pH 6.4. The barium titanate powder is presintered at a temperature ranging from 900 to 1200° C. The barium titanate powder has superior dispersion characteristics in slurrying, and is capable of partly inhibiting agglomeration of the barium titanate after sintering. It is therefore suitable as materials for dielectric layers of multilayer ceramic capacitors. In particular, the barium titanate has a sintered density of 95% or more of the theoretical density thereof, and the dielectric constant is 4000 or more.

6 Claims, No Drawings

BARIUM TITANATE POWDER

TECHNICAL FIELD

The present invention relates to a barium titanate powder having superior dispersion characteristics, which is suitable for dielectric materials for electrical parts such as PTC thermistors and multilayer ceramic capacitors.

BACKGROUND ART

Multilayer ceramic capacitors are manufactured by alternately laminating ceramic dielectric layers and internal electrode layers, and then firmly pressing and sintering them to form an integrated body. Barium titanate powder slurry is widely used for the ceramic dielectric layers. Recently, the ceramic dielectric layer is particularly made to be thinner, so as to meet requirements of compact design and increased capacity. In order to obtain a ceramic dielectric layer having satisfactory voltage tolerance characteristics, the particle size distribution of the barium titanate powder must be in a narrow range of 0.2 to 1.0 $\mu$m, and the dispersion characteristics in the slurrying of the barium titanate powder must be superior. If the dispersion characteristics of the barium titanate powder in the slurry are not good, the barium titanate particles partly agglomerate after sintering, so that the density distribution of layer is not uniform. As a result, an insulated barium titanate layer is formed in some cases, and this therefore poses a problem in that the capacity of the condenser may not be sufficient.

Heretofore, barium titanate powders have been produced by mixing titanium compounds and barium compounds, and then sintering them so as to cause a solid phase reaction. However, in such a production method, the above chemical compounds are made to react at high temperatures, causing the particle sizes of the obtained barium titanate powders to increase, the particle size distribution thereof to broaden, and the shapes thereof to become irregular. Therefore, the dispersion characteristics of the barium titanate powder in the slurry is not so good. Japanese Unexamined Patent Publication No. 330824/93 discloses a production process in which a cubic spherical barium titanate powder having good dispersion characteristics can be obtained. According to the disclosure, hydrogen peroxide is added to a titanium compound and a barium compound so as to wet react them and obtain a barium titanate powder. Furthermore, the barium titanate powder having particle sizes ranging from 0.2 to 5 $\mu$m, obtained by this production process, is presintered at temperatures ranging from 600 to 1100° C. Japanese Unexamined Patent Publication No. 155532/85 discloses a production process for a barium titanate powder by a wet method. According to the disclosure, the hydrolysis products of a titanium compound, a water-soluble barium salt, and a water-soluble strontium salt are reacted in a strong alkali, to obtain fine particles of barium titanate strontium.

In addition, Kyng-Hee Lee disclosed a wet synthetic method in the J. Korean Ceram. Soc., vol. 21, no. 4 (1984) pages 323–326. According to this synthetic method, a mixed solution of titanium chloride and barium chloride is reacted with KOH at 100° C. or less, so that a finely crystalline barium titanate powder of high purity is efficiently obtained. The wet synthetic method has advantages in that the control of particle size is easy, fine globular barium titanate powders can be obtained, and by-products other than barium titanate are not included in the final product.

For a barium titanate powder used for a ceramic dielectric layer of a multilayer ceramic capacitor, the dispersion characteristics in the slurry condition is the most important, as mentioned above. In the production processes disclosed in the above references, although improvements are made in the particle size, the particle size distribution, and the shape of the barium titanate powder, the dispersion characteristics of the barium titanate powder are still not satisfactory. Therefore, the agglomeration occurs when it is actually slurried, and satisfactory characteristics for dielectric layers have not yet been obtained.

DISCLOSURE OF THE INVENTION

It is an object of the present invention to provide a barium titanate powder having superior dispersion characteristics in slurried condition, in which partial agglomeration of the barium titanate particles after sintering can be inhibited, thereby providing suitable barium titanate powders for materials for dielectric layers in multilayer ceramic capacitors. In particular, an object of the present invention is to provide a barium titanate powder in which the density of the sintered compact is 95% or more of the theoretical density and the dielectric constant is 4000 or more.

The inventors have researched to achieve the above objects, and have discovered a barium titanate powder having superior dispersion characteristics in slurried conditions, which is suitable for materials for dielectric layers in electrical components such as multilayer ceramic capacitors and PTC thermistors, thereby completing the invention.

The present invention provides a barium titanate powder comprising an average particle size ranging from 0.1 to 1.0 $\mu$m, a CV value (standard deviation of the particle size/the average particle size) of the particle size distribution of 40% or less, and a zeta-potential ranging from −30 to −60 mV measured by a laser Doppler method using electrophoresis at pH 6.4.

The invention will be explained in more detail hereinafter. The barium titanate powder according to the invention has an average particle size ranging from 0.1 to 1.0 $\mu$m, enabling production of a dielectric layer as a thin laminate, preferably ranging from 0.1 to 0.5 $\mu$m, and more preferably ranging from 0.1 to 0.3 $\mu$m. In the invention, the CV value (standard deviation of the particle size/the average particle size), which is one index of the particle size distribution of the barium titanate powder, is 40% or less, preferably 35% or less, and more preferably 30% or less. The average particle size, the standard deviation of the particle size, and the CV value are measured by observing the barium titanate powder through an electron microscope and analyzing the observed image. The CV value is an index of the distribution of all particle sizes with respect to the average particle size. The particle size distribution narrows and the particles are more uniform, as the CV value decreases.

In the barium titanate powder according to the invention, the zeta-potential, measured by a laser Doppler method using electrophoresis at pH 6.4, is in the range of −30 to −60 mV, preferably in the range of −35 to −55 mV, and more preferably in the range of −40 to −50 mV. The zeta-potential refers to the difference between the potential of the outermost sliding surface of the ionic fixation layer which moves adhering to the solid, and the potential of the inside of the liquid, when solid and liquid electrolyte solutions move relatively. The zeta-potential varies according to the material. In a metal oxide such as barium titanate, the zeta-potential is an index showing acid and alkali characteristics of hydroxyl groups at the surfaces of particle.

In addition, the barium titanate powder of the invention is preferably presintered at temperatures ranging from 900 to 1200° C. By presintering prior to sintering, the dielectric constant, the dielectric loss and the insulation resistance may be improved.

Production processes for the barium titanate powder according to the invention are not limited. A method using the liquid-phase method, called the "sol-gel method" or the "direct synthesis method" is more desirable than method using reactions by heating to high temperatures, such as the solid phase method and the hydrothermal method. In particular, reaction methods, in which aqueous solutions of titanium compounds and aqueous solutions of barium compounds come into contact with each other in an alkali region may be preferable.

More particularly, an aqueous solution of titanium compounds and an alkali aqueous solution of barium compounds come into contact with each other while being stirred, and while controlling the mole ratio of titanium compound/barium compound to the range of 0.8 to 1.2. As the titanium compound, one or more compounds chosen from the group consisting of halides, hydroxides, nitrates, sulfates, acetates, perchlorates, oxalates, and alkoxides may be employed. As specific chemical compounds, titanium tetrachloride, titanium trichloride, titanium hydroxide, and titanil sulfate may be mentioned. Among these compounds, titanium tetrachloride is preferably used.

As barium compounds, one or more compounds chosen from the group consisting of halides, hydroxides, nitrates, sulfates, acetates, perchlorates, oxalatea and alkoxides may be employed. As specific chemical compounds, barium chloride, barium hydroxide, barium nitrate, barium sulfate, barium acetate, etc., may be employed. Among these compounds, barium chloride and barium hydroxide are preferably used. Alternatively, halides such as barium chloride, and barium salt compounds such as nitrates, sulfates and acetates may be beforehand came into contact with hydroxides such as NaOH or KOH which are obtained from alkali metals, and they are reacted by heating, thereby obtaining refined barium hydroxide, which may used.

One or more kinds of the above titanium compounds and the barium compounds may be used in combination. Although the combination is optional, the following combinations are preferable for the invention.

(1) Titanium tetrachloride and barium chloride
(2) Titanium tetrachloride and barium hydroxide
(3) Titanium tetrachloride, barium chloride, and barium hydroxide
(4) Titanium tetrachloride, titanium trichloride, and barium chloride
(5) Titanium tetrachloride, titanium trichloride, barium chloride, and barium hydroxide Preferable embodiments according to the above-mentioned production method, in which titanium tetrachloride is used for the titanium compound, will be explained hereinafter. In the production method, a titanium tetrachloride aqueous solution (I) (referred to simply as "aqueous solution (I)" hereinafter) for titanium tetrachloride is prepared in a holding vessel. A barium compound (one or more kinds chosen from the group consisting of halides, hydroxides, nitrates, sulfates, acetates, perchlorates, oxalates, and alkoxides) alkali aqueous solution (II) (referred to simply as "aqueous solution (II)" hereinafter) is prepared in a holding vessel. The aqueous solutions (I) and (II) are then mixed while being stirred. Aqueous solutions (I) and (II) are adjusted as follows.

(1) Titanium Tetrachloride Aqueous Solution (I)
(Titanium tetrachloride concentration)

Titanium tetrachloride concentration of the titanium tetrachloride aqueous solution (I) is 0.1 mol/L or more, preferably in the range of 0.4 to 3.0 mol/L, and more preferably in the range of 0.4 to 3.0 mol/L for improving purity. The titanium tetrachloride concentration is preferably higher for improving productivity since the reaction rate is extremely low below 0.1 mol/L. In the invention, the aqueous solution of a single titanium compound like titanium tetrachloride is used, so that the concentration of the raw material aqueous solution can be higher, thereby improving productivity.
(Temperature)

The temperature of the titanium tetrachloride aqueous solution (I) is preferably maintained in the range of 30 to 90° C. by preheating, and more preferably in the range of 40 to 50° C. If the temperature of the aqueous solution (I) exceeds 60° C., the titanium tetrachloride hydrolyzes and solid components precipitate. As a result, a uniform aqueous solution cannot be obtained, and control of the barium/titanium atomic ratio of the product becomes difficult.
(Water used for titanium tetrachloride aqueous solution (I))

Deionized water, treated using an ion-exchange resin, is preferably used for the titanium tetrachloride aqueous solution (I), and more preferably, dissolved gases such as carbon dioxide in the water are also removed. The titanium tetrachloride aqueous solution (I) is preferably dehydrochlorinated by means of bubbling argon gas therethrough before it contacts the barium compound alkali aqueous solution (II). For the treatment, the chlorine content in the obtained barium titanate powder can be reduced.

The titanium tetrachloride aqueous solution (I) is preferably held without contact with air. More preferably, the dissolved gases in the titanium tetrachloride aqueous solution (I) may be removed before the reaction. If the removal of gas is insufficient, foaming occurs in the liquid phase in the reaction, and the shapes of the particles generated are not uniform.

(2) Barium Compound Alkali Aqueous Solution (II)
(Barium concentration)

The barium ion concentration of the barium compound alkali aqueous solution (II) is preferably 0.05 mol/L or more, and is more preferably in the range of 0.1 to 2.0 mol/L. The barium ion concentration is preferably higher for improvement in productivity since the reaction rate is extremely low below 0.05 mol/L. By separately preparing the barium compound aqueous solution and the titanium compound aqueous solution, and by using them as raw material aqueous solutions, the barium ion concentration can be high in a manner similar to the above aqueous solution (I), thereby improving productivity.
(Alkali concentration)

Hydroxides such as NaOH or KOH and the like, obtained from alkali metals are used as the alkali sources for the barium compound alkali aqueous solution (II). The alkali concentration of the aqueous solution (II) is normally in the range of 0.2 to 15 mol/L, and preferably is at a concentration sufficient to convert the above barium compounds into hydroxides; that is, the concentration should be equal to or greater than the barium ion concentration. Thus, the barium compound is mixed with the alkali compound beforehand, so that halides such as barium chloride, and barium salt compounds such as nitrates, sulfates, acetates are first converted into barium hydroxide, and are then mixed and react with the titanium compound aqueous solution (I). In methods in which a titanium tetrachloride aqueous solution and a barium chloride aqueous solution are contacted and mixed with each other simultaneously in an alkali aqueous solution, alternatively, a mixed aqueous solution of a titanium tetrachloride aqueous solution and a barium chloride aqueous solution is added to an alkali aqueous solution for a catalytic reaction, and the chlorine portion readily remains in the barium titanate of the reaction product. According to the invention, the barium compound is prepared beforehand as an alkali aqueous solution and is converted to a hydroxide, so that the reaction thereof with the titanium compound progresses more uniformly, and barium titanate which has less chlorine and higher purity can be produced.

In addition, barium hydroxide may be used as an alkali source without using the above hydroxide obtained from the alkali metal. That is, in aqueous solution (II), the barium compound may be prepared from only barium hydroxide; alternatively, it may be prepared from barium hydroxide and barium compounds such as barium chloride except for barium hydroxide. Thus, the titanium compound aqueous solution (I) and the aqueous solution (II) of the barium compound and the barium hydroxide are contacted with each other, whereby barium titanate is produced. For this process, contamination by metal impurities is prevented since metal components except for titanium and barium are not used, so that barium titanate of higher purity can be produced.

(Temperature)

The temperature of the barium compound alkali aqueous solution (II) is preferably maintained in the range of 80 to 100° C. by preheating, so that reaction with the titanium tetrachloride aqueous solution (I) is promoted. The reaction temperature is preferably maintained approximately constant by restricting temperature fluctuation within ±1° C. during reaction of the aqueous solutions (I) and (II), so that the barium/titanium atomic ratio of the obtained barium will be stable.

(Water used for barium compound alkali aqueous solution)

Deionized water treated using an ion-exchange resin is preferably used for the barium compound alkali aqueous solution (II), and more preferably, dissolved gases such as carbon dioxide in the water may be removed.

(Filtration treatment)

Although the barium compound alkali aqueous solution (II) obtained by the above method can be used as it is, the aqueous solution (II) is preferably filtered in advance, so that the barium/titanium atomic ratio can be easily controlled and higher purity can effectively be obtained. For example, when NaOH is used as an alkali source, sodium carbonate in NaOH as an impurity reacts with the barium compound, and barium carbonate precipitates. Since the precipitated barium carbonate contaminates in the reaction, it is preferably removed beforehand by the filtering. In contrast, in the conventional method, a mixed solution of a titanium compound and a barium compound is added to an alkali aqueous solution. Alternatively, a titanium compound aqueous solution and a barium compound aqueous solution are individually added to an alkali aqueous solution, or both the aqueous solutions are mixed with each other to be added to an alkali aqueous solution. Compared to the conventional methods, the method of the invention, in which a barium compound alkali aqueous solution and a titanium compound aqueous solution are separately prepared and contacted with each other, can yield barium titanate of higher purity.

The barium compound alkali aqueous solution (II) described above is preferably held while avoiding contact with air in a manner similar to the titanium tetrachloride aqueous solution (I). The barium compound alkali aqueous solution (II) is preferably degased prior to the reaction.

Next, a method in which the above aqueous solutions (I) and (II) are contacted with each other will be explained hereinafter.

First, the alkali concentration of the aqueous solution (II) is adjusted so that the pH during contact and reaction is 13 or more, preferably 13.5 or more, and more preferably 13.8 or more. In order to maintain the above predetermined pH value during the reaction, an alkali aqueous solution such as a NaOH aqueous solution may be supplied at a necessary feed rate from an optional supply system. An alkali aqueous solution which is adjusted to a predetermined concentration may preferably be injected into a reaction vessel in advance, and then the aqueous solutions (I) and (II) are added thereto to contact with each other. The alkali aqueous solution is preferably preheated to the reaction temperature, and is alternatively preheated to a temperature higher than the reaction temperature so that the temperature of all of solution will be adjusted to the reaction temperature after the aqueous solutions (I) and (II) are added. Thus, the pH value in the reaction is maintained constant, so that a uniform reaction is maintained. As a result, uniform barium titanate having a controlled barium/titanium ratio is produced.

In addition, the mole ratio of the titanium compound/barium compound is preferably controlled in the range of 0.8 to 1.2 when the aqueous solutions (I) and (II) are contacted and reacted with each other. Not only the mole ratio, but also the absolute concentration in the reaction system of the titanium compound or the barium compound, is preferably maintained to be as constant as possible from the initiation of the reaction to the completion of the reaction, so that the reaction proceeds uniformly. In a method in which the alkali aqueous solution is injected into the reaction vessel in advance, and then the aqueous solutions (I) and (II) are added thereto, the concentrations of the titanium compound and the barium compound are diluted in the initial stage of the reaction. A reaction under diluted conditions results in a barium/titanium atomic ratio in which the amount of barium titanate is too low. Therefore, the barium compound used beforehand in the aqueous solution (II) or the titanium compound used beforehand in the aqueous solution (I) is added to the alkali aqueous solution in the reaction vessel. In particular, the concentration of the barium compound affects the barium/titanium atomic ratio in the barium titanate produced. Therefore, the barium compound is preferably added to the alkali aqueous solution in the reaction vessel, as mentioned above.

Next, the aqueous solutions (I) and (II) are supplied from the holding vessel to the reaction vessel via pipes by means of pumps, and are stirred and contacted with each other. In this condition, the aqueous solutions (I) and (II) are instantaneously and continuously supplied into the reaction vessel at a constant feed rate, so that the mole ratio of titanium compound/barium compound is adjusted to be in the range of 0.8 to 1.2, preferably in the range of 1.0 to 1.2, and more preferably in the range of 1.07 to 1.12. The aqueous solutions (I) and (II) should be stirred by an agitator provided in the reaction vessel when they are supplied into the reaction vessel. If no agitator is provided, chaotic flow may be generated by line mixing and the like, so that the aqueous solutions (I) and (II) are mixed and contacted uniformly after being supplied.

The reaction temperature during contact and reaction of the aqueous solutions (I) and (II) is preferably set in the range of 80 to 100° C., more preferably in the range of 85 to 95° C., and is controlled to be approximately constant within ±1° C. of the set temperature.

The aqueous solutions (I) and (II) are contacted with each other in the reaction vessel, and this is stirred for a sufficient time (a few seconds to 20 minutes) so that particulate barium titanate is produced. The produced barium titanate may be continuously extracted as a slurry (continuous reaction), or may be alternatively removed after the reaction in the reaction vessel (batch reaction) is completed.

The thus produced barium titanate is preferably treated with a heat treatment in the slurry condition after the reaction (aging reaction). The temperature of the heat treatment is normally in the range of 80 to 100° C. which is the same as the reaction temperature, or at a higher temperature in the range of 100 to 200° C. The period for heat treatment is normally in the range of 1 minute to 10 hours, and is preferably in the range of 1 minute to 30 minutes. By the heat treatment, unreacted titanium compounds and unreacted barium compounds will completely react, and the crystallinity of the particles is improved by the heat treatment of the particles. As a specific method, the slurry including the produced barium titanate is treated at a predetermined temperature for a predetermined period in the reactor, or in an aging tank to which the slurry is transferred from the reaction vessel. After the heat treatment, the barium titanate is washed, unreacted chemical compounds and the alkaline component, and byproducts of alkali salts are sufficiently removed, thereby isolating barium titanate. General methods such as decanting, centrifugal separation, or filtering can be adopted for the washing and the isolation. After the isolation, the barium titanate is dried by heating in air or in inert gas at a temperature in the range of 50 to 300° C., or alternatively in vacuum at a temperature in the range of 20 to 300° C., so that the alkaline components are ultimately removed, and the barium titanate powder is refined.

The thus obtained barium titanate powder is preferably presintered in air at a temperature in the range of 900 to 1200° C. to yield barium titanate powder. The barium titanate powder may be presintered at a temperature in the range of 1200 to 1300° C., when it is to be used for dielectric layers in multilayer ceramic capacitors. Dielectric characteristics such as dielectric constant are improved by presintering in advance as described.

The particle size and the CV value of the barium titanate powder thus produced were measured. The particle size was in the range of 0.1 to 1.0 $\mu$m, and the CV value was 40% or less, and thus barium titanate powder having superior particle size distribution characteristics was obtained. The zeta-potential was in the range of −30 to −60 mV measured by a laser Doppler method using electrophoresis of the barium titanate powder at pH 6.4, thereby exhibiting superior dispersion characteristics. The dielectric compact obtained by sintering the barium titanate powder of the invention exhibits superior dielectric characteristics in which the density thereof is 95% or more of the theoretical density, the dielectric constant is 4500 or more, the dielectric loss is 2.0% or less, and the insulation resistance is $2 \times 10^{12} \Omega$ or more. In the barium titanate powder of the invention, the particle size distribution is narrow, the dispersion characteristics in slurrying is superior, and the electrical characteristics are superior; it is therefore highly suitable as a material for dielectric layers in multilayer ceramic capacitors.

BEST MODE FOR CARRYING OUT THE INVENTION

Examples of the invention will be explained hereinafter. The various physical properties of barium titanate powders produced by the examples were measured by the following methods.

(1) Average Particle Size, CV Value

The average particle size of the obtained barium titanate powder was measured by electron micrography (SEM diameter), and based on this, the CV value (standard deviation of the particle size/average particle size) was obtained.

(2) Zeta-potential

The zeta-potential when the obtained barium titanate powder was suspended in pure water was obtained by the following method based on the laser Doppler method. That is, DELSA 440SX provided by CouHer Co. was used as the zeta-potential measuring instrument. A sample of the barium titanate powder was suspended in distilled water beforehand so as to adjust the concentration to 0.005 weight % at pH 6.4. Then, it was vibrated for 3 minutes by ultrasonic waves, and was injected into a measuring cell of the above measuring instrument. The zeta-potential was measured, after the cell temperature was stabilized within the range of 25±0.2° C.

(3) Barium/titanium Atomic Ratio

The barium/titanium atomic ratio (Ba/Ti ratio) of the obtained barium titanate powder was obtained by the following method. That is, with respect to barium, the sample was decomposed by adding sulfuric acid, ammonium sulfate, and nitric acid, and was dissolved by adding water. Then, the barium component in the sample was precipitated as barium sulfate, and the solution was filtered. The remainder of the sample was incinerated, ignited, and cooled, and then the barium sulfate was weighed to determine the quantity of barium. In the meantime, with respect to titanium, the sample was decomposed by adding sulfuric acid, ammonium sulfate, and nitric acid, and was dissolved by adding water. Hydrochloric acid and sulfuric acid were added to the sample, then titanium (IV) was reduced to metallic aluminum. After cooling the sample, an ammonium sulfate iron (III) standard solution was titrated to the sample using an ammonium thiocyanate solution as an indicator so as to determine the quantity of titanium.

(4) Dispersion Characteristics A

In order to confirm the dispersion characteristics of the obtained barium titanate powder, the barium titanate powder was suspended in water, and the average particle size was measured by a laser light scattering method particle size measuring instrument, LA700 (made by HORIBA), and it was compared to the SEM diameter measured in the above.

(5) Dispersion Characteristics B

In order to evaluate the dispersion characteristics of the barium titanate powder, the powder was dispersed in an organic solvent and was coated in a sheet. The sheet was observed by electron microscope to evaluate the uniformity of the thickness thereof.

(6) Sintered Density, Electrical Characteristic

The barium titanate powder was sintered, and the sintered density thereof was measured based on the Archimedes method. Sintered density (%) refers to the percentage of the theoretical density of 100. The dielectric constant and the dielectric loss were measured by an LCR meter (1 KHz, 1V). The insulation resistance was measured using an insulation resistance tester (IR meter).

EXAMPLE 1

A $TiCl_4$ aqueous solution ($TiCl_4$ concentration of 0.5 mol/L) heated to 60° C. and a mixed aqueous solution of $Ba(OH)_2$ and NaOH (the $Ba(OH)_2$ concentration being 0.3 mol/L; the NaOH concentration being 2.8 mol/L) heated to 60° C. were maintained at pH 13.8 or more, and were continuously supplied to a reaction tank in containing a NaOH aqueous solution maintained at 90° C. was filled. Then, the slurry including $BaTiO_3$ generated in the reaction tank was supplied to an aging tank, and aged for 5 minutes. Then, the slurry including $BaTiO_3$ was continuously extracted from the aging tank and was filtered so that the BaTiO$_3$ particles were isolated. After the BaTiO$_3$ particles were repeatedly washed until chlorine ions could not be detected, the particles were dried in a vacuum at 50° C. so as to obtain barium titanate powder.

The average particle size, the CV value, the zeta-potential, and the Ba/Ti ratio (the above (1) to (4)) were measured. The results are shown in Table 1. The dispersion characteristics were evaluated by making a sheet from the powder. Consequently, there was absolutely no problem in practical use, and no nonuniform thickness portion was observed.

EXAMPLES 2

The barium titanate powder obtained in Example 1 was presintered at 1000° C. for 1 hour and was cooled to room temperature. Then, the barium titanate powder was crushed, and sintered in air at 1250° C. for 2 hours so as to obtain a sintered compact. The above mentioned measurements (6) (sintered density, dielectric constant, dielectric loss, and insulation resistance) were performed on the sintered compact. The results are shown together in Table 1.

EXAMPLES 3

A sintered compact of barium titanate according to Example 3 was obtained by the same process as in Example 2, except that the presintering in Example 2 was omitted and sintering was performed in air at 1200° C. for 2 hours. The measurements according to the above (6) were performed and the results thereof are shown together in Table 1.

EXAMPLE 4

A flask with a stirring device and a capacity of 2000 cc made by stainless steel was provided as a reaction vessel. A NaOH aqueous solution with a concentration of 0.92 normal was injected beforehand into the reaction vessel, and the NaOH aqueous solution was maintained at about 90° C.

A TiCl$_4$ aqueous solution (using ion-exchanged water; TiCl$_4$ concentration of 0.472 mol/L) which was heated and held at 40° C., and a BaCl$_2$/NaOH aqueous solution (using ion-exchanged water; BaCl$_2$ concentration of 0.258 mol/L; NaOH concentration of 2.73 mol/L) from which the undissolved portion was removed and which was heated and maintained at about 95° C. were prepared. These aqueous solutions were continuously supplied by pumps into the reaction vessel at a feed rate of the TiCl$_4$ aqueous solution of 77 cc/min and a feed rate of the BaCl$_2$/NaOH aqueous solution of 151 cc/min. In this procedure, the mole ratio of TiCl$_4$/BaCl$_2$ was 1.07. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the TiCl$_4$ aqueous solution and the BaCl$_2$/NaOH aqueous solution. Then, the pump was stopped and the slurry was stirred for 5 minutes. Next, decanting was performed in the aging tank so as to separate the supernatant and the sediment, and centrifugal separation was carried out. Then, pure water washing, decanting and centrifugal separation were performed several times, and barium titanate powder was collected. The collected barium titanate powder was dried by heating in air at 100° C., and barium titanate powder according to Example 4 was obtained. The same measurements as in Example 1 were performed and the results thereof are shown together in Table 1.

EXAMPLE 5

A flask with a stirring device and a capacity of 2000 cc made by stainless steel was provided as a reaction vessel. A NaOH aqueous solution with a concentration of 0.77 normal was injected beforehand into the reaction vessel, and the NaOH aqueous solution was maintained at about 90° C.

A TiCl$_4$ aqueous solution (using ion-exchanged water; TiCl$_4$ concentration of 0.466 mol/L) which was heated and held at 40° C., and a Ba(OH)$_2$/NaOH aqueous solution (using ion-exchanged water; Ba(OH)$_2$ concentration of 0.264 mol/L; NaOH concentration of 2.09 mol/L) from which the undissolved portion was removed and which was heated and maintained at about 95° C. were prepared. These aqueous solutions were continuously supplied by a pump into the reaction vessel at a feed rate of the TiCl$_4$ aqueous solution of 80 cc/min and a feed rate of a Ba(OH)$_2$/NaOH aqueous solution of 158 cc/min. In this procedure, the mole ratio of TiCl$_4$/Ba(OH)$_2$ was 1.11. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the TiCl$_4$ aqueous solution and the Ba(OH)$_2$/NaOH aqueous solution. Then, the pump was stopped and the slurry was stirred for 5 minutes in the aging tank. Next, decanting was performed in the aging tank so as to separate the supernatant and the sediment, and centrifugal separation was performed. Then, pure water washing, decanting and centrifugal separation were performed several times, and barium titanate powder was collected. The collected barium titanate powder was dried by heating in air at 100° C., and the barium titanate powder according to Example 5 was obtained. The same measurements as in Example 1 were performed, and the results thereof are shown together in Table 1.

EXAMPLE 6

A barium titanate powder according to Example 6 was obtained by the same process as in Example 4, except that a TiCl$_4$ aqueous solution with a TiCl$_4$ concentration of 2.25 mol/L was supplied at a feed rate of 100 cc/min and a BaCl$_2$/NaOH aqueous solution with a BaCl$_2$ concentration of 1.25 mol/L and a NaOH concentration of 8.3 mol/L was supplied at a feed rate of 200 cc/min. The same measurements as in Example 1 were performed, and the results thereof are shown together in Table 1.

COMPARATIVE EXAMPLE 1

A flask with a stirring device and a capacity of 2000 cc made by stainless steel was provided as a reaction vessel. A NaOH aqueous solution with a concentration of 0.92 normal was injected beforehand into the reaction vessel, and the NaOH aqueous solution was maintained at about 90° C.

A TiCl$_4$ aqueous solution (using ion-exchanged water; TiCl$_4$ concentration of 0.472 mol/L) which was heated and held at 40° C., and a BaCl$_2$ aqueous solution (using ion-exchanged water; BaCl$_2$ concentration of 0.258 mol/L) from which the undissolved portion was removed and which was heated and maintained at about 95° C. were mixed so as to prepare a TiCl$_4$/BaCl$_2$ mixed aqueous solution. Then, the mixed aqueous solution was continuously supplied by a pump into the reaction vessel at a feed rate of 77 cc/min. In this procedure, the temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by pump at a feed rate of 77 cc/min. Then, the pump was stopped and the slurry was stirred for 5 minutes. Next, decanting was performed in the aging tank so as to separate the supernatant and the sediment, and centrifugal separation was carried out. Then, pure water washing, decanting, and centrifugal separation were performed several times, and barium titanate powder was collected. The collected barium titanate powder was dried by heating in air at 100° C., and barium titanate powder according to Comparative Example 1 was obtained. The same measurements as in Example 1 were performed, and the results thereof are shown together in Table 1.

COMPARATIVE EXAMPLE 2

A barium titanate powder according to Comparative Example 2 was obtained by the same process as in Comparative Example 1, except that a $TiCl_4$ aqueous solution (using ion exchanged water; $TiCl_4$ concentration of 2.25 mol/L) and a $BaCl_2$ aqueous solution (using ion-exchanged water; $BaCl_2$ concentration of 2.5 mol/L) were mixed to prepare a mixed aqueous solution. The same measurements as in Example 1 were performed, and the results thereof are shown together in Table 1.

COMPARATIVE EXAMPLE 3

A flask with a stirring device and a capacity of 2000 cc made by stainless steel was provided as a reaction vessel. A NaOH aqueous solution with a concentration of 0.92 normal was injected beforehand into the reaction vessel, and the NaOH aqueous solution was maintained at about 90° C.

A $TiCl_4$ aqueous solution (using ion-exchanged water; $TiCl_4$ concentration of 0.472 mol/L) which was heated and held at 40° C., and a $BaCl_2$ aqueous solution (using ion-exchanged water; $BaCl_2$ concentration of 0.258 mol/L) from which the undissolved portion was removed and which was heated and maintained at about 95° C. were prepared. These aqueous solutions were continuously supplied by a pump into the reaction vessel at a feed rates of the $TiCl_4$ aqueous solution of 77 cc/min and a feed rate of the $BaCl_2$ aqueous solution of 151 cc/min. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the $TiCl_4$ aqueous solution and the $BaCl_2$ aqueous solution. Then, the pump was stopped and the slurry was stirred for 5 minutes. Next, decanting was performed in the aging tank so as to separate the supernatant and the sediment, and centrifugal separation was performed. Then, pure water washing, decanting and centrifugal separation were performed several times, and barium titanate powder was collected. The collected barium titanate powder was dried by heating in air at 100° C., and the barium titanate powder according to Comparative Example 3 was obtained. The same measurements as in Example 1 were performed, and the results thereof are shown together in Table 1.

COMPARATIVE EXAMPLE 4

A $BaCO_3$ powder and a $TiO_2$ powder were prepared, and these base powders were weighed so as to be in a one-to-one at mole ratio. These powders were put into a ball mill with water and zirconia balls (1.5 mm diameter), and wet mixed for 15 hours. Then, the obtained slurry was put into a drier and was dried at 150° C. so as to obtain a mixed powder. Then, the mixed powder was placed into an electric furnace and sintered at 1000° C. for 4 hours, and solid phase chemical reaction between $BaCO_3$ particles and $TiO_2$ particles occurred, and a barium titanate powder was synthesized. The measurements (1) and (2) were performed on the obtained barium titanate powder, and the results thereof are shown together in Table 1.

COMPARATIVE EXAMPLE 5

0.1 mole of titanium isopropoxide ($Ti(O-i-C_3H_7)_4$) was accurately weighed and was placed into a Teflon beaker having a capacity of about 400 ml with about 30 ml of isopropyl alcohol so and was dissolved. 120 ml of an aqueous solution containing 0.2 mole of sodium hydroxide was added to the solution while stirring the solution so that it is hydrolyzed. Then, 0.15 mole of barium chloride was added to the reaction solution, and hydrothermal synthesis was performed using an autoclave for 4 hours at 160° C. and 10 $kg/cm^2$ while stirring. The sediment in the beaker was removed after the reaction was completed, and was washed and filtered several times, and was then dried and crushed to obtain barium titanate powder. The same measurements as in Comparative Example 4 were performed to the obtained barium titanate powder, and the results thereof are shown together in Table 1.

TABLE 1

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| CV Value (Standard Deviation/ Average Particle Size) | 25 | — | — | 21 | 24 | 25 | 35 | 40 | 45 | 51 | 40 |
| SEM Diameter ($\mu$m) | 0.20 | — | — | 0.18 | 0.19 | 0.21 | 0.15 | 0.25 | 0.22 | 0.55 | 0.40 |
| Zeta-Potential (mV) | −48 | — | — | −48 | −45 | −48 | −20 | −22 | −24 | −19 | −13 |
| Average Particle Size by Laser Light Scattering Method ($\mu$m) | 0.45 | — | — | 0.50 | 0.55 | 0.57 | 0.70 | 0.75 | 0.80 | — | — |
| Ba/Ti Atomic Ratio | 1.001 | — | — | 1.002 | 0.995 | 1.001 | 1.989 | 0.980 | 0.985 | — | — |
| Sintering Density (g/cm$^3$) | C | 5.97 (99%) | 5.89 (96%) | — | — | — | — | — | — | — | — |
| Dielectric Constant | — | 5100 | 4190 | — | — | — | — | — | — | — | — |

TABLE 1-continued

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Dielectric Loss (%) | — | 1.9 | 1.6 | — | — | — | — | — | — | — | — |
| Insulation Resistance (Ω) | — | $2 \times 10^{12}$ | $1 \times 10^{12}$ | — | — | — | — | — | — | — | — |

As is clearly shown in Table 1, in the barium titanate power according to the invention, the particle size distribution is narrow since the CV value is small compared to conventional barium titanate powders, and dispersion characteristics are superior since the zeta-potential is low and the difference between the SEM diameter and the average particle size measured by the laser light scattering method is small. Moreover, the Ba/Ti ratio is very close to 1. In addition, the sintered compact of Example 2, in which the barium titanate of the invention was sintered after presintering, exhibits remarkably superior sintered density, dielectric constant and insulation resistance compared to the compact as sintered without the presintering.

As described above, according to the barium titanate powder of the invention, the dispersion characteristics thereof are superior in slurrying, and they are remarkably promising as materials for ceramic dielectric layers of laminated ceramic capacitors.

What is claimed is:

1. A barium titanate powder comprising:

an average particle size ranging from 0.1–1.0 μm, a CV value (standard deviation of the particle size/the average particle size) of the particle size distribution being 40% or less, and a zeta-potential ranging from −30 to −60 mV measured by a laser Doppler method using electrophoresis at pH 6.4.

2. A barium titanate powder according to claim 1, wherein the barium titanate powder is presintered at a temperature ranging from 900 to 1200° C.

3. A barium titanate powder according to claim 1, wherein the barium titanate powder is obtained by mixing and reacting an alkali solution of one or more titanium compounds chosen from the group consisting of halides, hydroxides, nitrates, sulfates, acetates, perchlorates and oxalates with a barium compound alkali solution.

4. A barium titanate powder according to claim 3, wherein the titanium compound is a titanium halide.

5. A barium titanate powder according to claim 3, wherein the titanium compound is a titanium tetrachloride.

6. A barium titanate powder according to claim 3, wherein the barium compound is at least one of barium chloride and barium hydroxide.

* * * * *

UNITED STATES PATENT AND TRADEMARK OFFICE
CERTIFICATE OF CORRECTION

PATENT NO.      : 6,284,216 B1                                         Page 1 of 1
DATED           : September 4, 2001
INVENTOR(S)     : Hideki Sakai et al.

It is certified that error appears in the above-identified patent and that said Letters Patent is hereby corrected as shown below:

<u>Title page,</u>
Item [22], change "Filed: Jan. 12, 2000" to -- PCT Filed: May 20, 1999 --;
Between Item [22] and Item [30], insert:

-- [86]  PCT No.:    PCT/JP99/02652
            §371 Date:    Jan. 12, 2000
            §102(e) Date:  Jan. 12, 2000
      [87]  PCT Pub. No.:  WO99/59918
            PCT Pub Date:  November 25, 1999 --.

Signed and Sealed this

Twenty-ninth Day of April, 2003

JAMES E. ROGAN
*Director of the United States Patent and Trademark Office*